United States Patent
El-Kik

(10) Patent No.: US 8,664,984 B2
(45) Date of Patent: Mar. 4, 2014

(54) PULSE SYNCHRONIZER CIRCUIT

(75) Inventor: Tony S. El-Kik, Allentown, PA (US)

(73) Assignee: LSI Corporation, San Jose, CA (US)

(*) Notice: Subject to any disclaimer, the term of this patent is extended or adjusted under 35 U.S.C. 154(b) by 40 days.

(21) Appl. No.: 13/485,982

(22) Filed: Jun. 1, 2012

(65) Prior Publication Data

US 2013/0321043 A1    Dec. 5, 2013

(51) Int. Cl.
*H03L 7/00* (2006.01)

(52) U.S. Cl.
USPC .......................... 327/145; 375/355

(58) Field of Classification Search
USPC ................... 327/145, 144, 141, 154; 375/355
See application file for complete search history.

(56) References Cited

U.S. PATENT DOCUMENTS

| | | | | |
|---|---|---|---|---|
| 5,598,113 | A * | 1/1997 | Jex et al. | 326/94 |
| 5,652,767 | A * | 7/1997 | Kiyonaga et al. | 375/317 |
| 5,999,023 | A * | 12/1999 | Kim | 327/144 |
| 6,529,570 | B1 * | 3/2003 | Miller et al. | 375/354 |
| 6,738,442 | B1 * | 5/2004 | Wilcox | 375/360 |
| 7,777,536 | B2 * | 8/2010 | Yagi | 327/141 |
| 7,990,296 | B1 * | 8/2011 | Wang et al. | 341/101 |
| 8,014,452 | B2 * | 9/2011 | Kubo et al. | 375/240.26 |
| 8,035,429 | B2 * | 10/2011 | Kim | 327/144 |
| 2003/0038681 | A1 * | 2/2003 | Djafari et al. | 331/1 A |
| 2013/0073890 | A1 * | 3/2013 | Lin | 713/400 |

* cited by examiner

*Primary Examiner* — Thomas J Hiltunen
(74) *Attorney, Agent, or Firm* — Mendelsohn, Drucker & Dunleavy, P.C.; Steve Mendelsohn

(57) ABSTRACT

A pulse synchronizer circuit converts an input data signal generated under a source-clock domain into an output data signal under a destination-clock domain, where the destination clock is independent of the source clock. The pulse synchronizer circuit successfully converts each data pulse in the input data signal into a corresponding data pulse in the output data signal when the source clock is faster than the destination clock, when the source clock is slower than the destination clock, when an input data pulse has a duration of one source-clock cycle, and when an input data pulse has a duration of multiple source-clock cycles. The pulse synchronizer circuit has source-domain circuitry and destination-domain circuitry. The source-domain circuitry detects input data pulses and determines whether they are single- or multi-cycle data pulses. The destination-domain circuitry generates output data pulses based on the processing of the source-domain circuitry.

8 Claims, 4 Drawing Sheets

100

PULSE SYNCHRONIZER CIRCUIT

BACKGROUND

1. Field of the Invention

The present invention relates to electronics and, more specifically but not exclusively, to circuitry for synchronizing pulses across asynchronous clock domains.

2. Description of the Related Art

This section introduces aspects that may help facilitate a better understanding of the invention. Accordingly, the statements of this section are to be read in this light and are not to be understood as admissions about what is prior art or what is not prior art.

In electronics, it is not unusual for circuitry operating in one clock domain (referred to herein as the source or input domain) to generate a data signal that needs to be processed by other circuitry operating in another, independent clock domain (referred to herein as the destination or output domain), where independent means that the destination clock may be asynchronous with respect to the source clock and/or have a speed different from that of the source clock, including non-integer multiples of one another. In some applications, the source clock is faster than the destination clock, while the source clock is slower than the destination clock in other applications. Furthermore, in some situations, a data pulse in the input data signal has a duration of one cycle of the source clock, while an input data pulse has a duration longer than one source clock cycle in other situations. Conventionally, two or more different circuits are provided to handle these different applications and/or situations.

SUMMARY

In one embodiment, the present invention is an apparatus comprising a pulse synchronizer circuit for converting an input data signal in a source-clock domain into an output data signal in a destination-clock domain. The pulse synchronizer circuit comprises a one-cycle pulse synchronizer, a multi-cycle pulse synchronizer, an output mux, and control logic. The one-cycle pulse synchronizer is configured to generate a first data signal indicative of input data pulses in the input data signal having a duration of one source-clock cycle. The multi-cycle pulse synchronizer is configured to generate a second data signal indicative of input data pulses in the input data signal having a duration of multiple source-clock cycles. The output mux is configured to receive the first and second data signals and generate the output data signal having an output data pulse for each detected input data pulse in the input data signal, and the control logic is configured to control the output mux.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
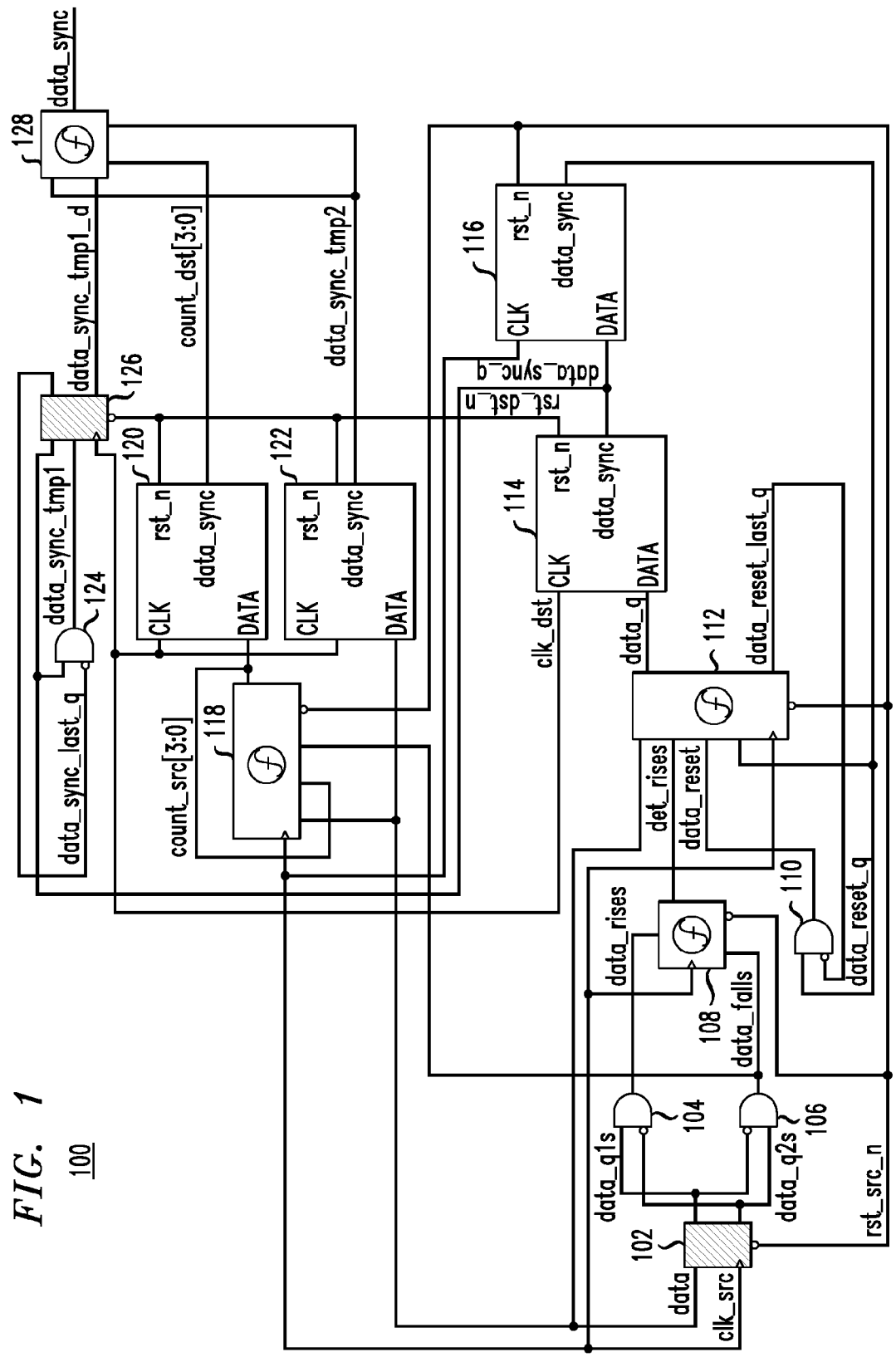
FIG. 1 shows a schematic block diagram of a pulse synchronization (sync) circuit according to one embodiment of the disclosure.

FIG. 1 shows a schematic block diagram of a pulse synchronization (sync) circuit 100 according to one embodiment of the disclosure. Pulse sync circuit 100 receives a source clock signal (clk_src) and an input data signal (data) generated by upstream circuitry (not shown) operating in the source domain. Pulse sync circuit 100 also receives a destination clock signal (clk_dst) and generates an output data signal (data_sync) that is synchronized to the destination clock and therefore suitable for processing by downstream circuitry (not shown) operating in the destination domain.

For every data pulse in the input data signal data, there is a corresponding data pulse in the output data signal data_sync. Note that, when the source clock is faster than the destination clock, there may be a limit to how close in time two consecutive input data pulses can be for pulse sync circuit 100 to be able to generate two distinct, corresponding output data pulses.

In addition to four AND gates 104, 106, 110, and 124 and logic element 128, which are all untimed signal-processing elements, pulse sync circuit 100 has ten timed signal-processing elements, five of which (i.e., delay element 102, logic elements 108 and 112, flip-flop (FF) 116, and counter 118) are timed by the source clock clk_src, and four of which (i.e., FFs 114, 120, and 122 and delay element 126) are timed by the destination clock clk_dst Delay element 102, which represents two flip-flops connected in series, latches the input data signal data to generate one-cycle-delayed data signal data_q1s and two-cycle-delayed data signal data_q2s. Thus, when data goes high, data_q1s goes high one source-clock cycle later and data_q2s goes high two source-clock cycles later, and, when data goes low, data_q1s goes low one source-clock cycle later and data_q2s goes low two source-clock cycles later.

AND gates 104 and 106 both receive the data signals data_q1s and data_q2s. AND gate 104 applies the logic-AND function to data_q1s and an inverted version of data_q2s to generate data signal data_rises, which therefore has a one-cycle source-clock pulse one cycle after each rising edge in the input data signal data. Similarly, AND gate 106 applies the logic-AND function to data_q2s and an inverted version of data_q1s to generate data signal data_falls, which therefore has a one-cycle source-clock pulse one cycle after each falling edge in the input data signal data.

The data signals data_rises and data_falls are both applied to logic element 108, which generates the data signal det_rises according to the following logic:

When data_rises goes high, then det_rises goes high in the next cycle; and

When data_falls goes high, then det_rises goes low in the next cycle.

Logic element 112 receives, among other signals, the data signal det_rises and generates the data signals data_q and data_reset_last_q. The logic applied by logic element 112 will be explained further below.

So far in this description of the operations of pulse sync circuit 100, all of the described data signals are in the source domain. FF 114 re-times the source-domain data signal data_q to generate data signal data_sync_q in the destination domain. FF 116 then re-times the destination-domain data signal data_sync_q to generate the data signal data_reset_q back in the source domain.

AND gate 110 applies the logic-AND function to the data signal data_reset_q from FF 116 and an inverted version of the data signal data_reset_last_q from logic element 112 to generate data signal data_reset, which is applied to logic element 112. Thus, when data_reset_q is high and data_reset_last_q is low, then data_reset is high. Otherwise, data_reset is low.

Logic element 112 applies the following logic:

If (the input data signal data is high and the data signal det_rises is low) or if (the data signal data_q is high and the data signal data_reset is low), then the data signal data_q is set high for the next source-clock cycle; otherwise, data_q is set low for the next source-clock cycle; and If the data signal data_reset_q is high, then the data signal data_reset_last_q is set high for the next source-clock cycle; otherwise, data_reset_last_q is set low for the next source-clock cycle.

When the input data signal data goes high, counter 118 begins to count at the next source-clock cycle, incrementing the four-bit counter signal count_src[3:0] by one for every source-clock cycle. If and when count_src reaches 5, then counter 118 stops incrementing count_src. When the data signal data_falls goes high, then counter 118 resets count_src to zero. Although pulse sync circuit 100 is designed to generate a counter signal having four bits and to stop counting when the value of that counter signal reaches a limit of 5, those skilled in the art will understand that other numbers of bits and/or other limit values can be used for alternative embodiments of pulse sync circuits of this disclosure.

FF 120 re-times the four-bit, source-domain counter signal count_src[3:0] to generate the four-bit counter signal count_dst[3:0] in the destination domain. Similarly, FF 122 re-times the input data signal data to generate the data signal data_sync_tmp2 in the destination domain.

Delay element 126 delays the data signal data_sync_q from FF 114 by one destination-clock cycle to generate the data signal data_sync_last_q. AND gate 124 applies the logic-AND function to the data signal data_sync_q from FF 114 and an inverted version of the data signal data_sync_last_q to generate the data signal data_sync_tmp1, which therefore has a one-cycle destination-clock pulse one cycle of the destination clock after each rising edge in the data signal data_sync_q. In addition, delay element 126 delays the data signal data_sync_tmp1 from AND gate 124 by one destination-clock cycle to generate the data signal data_sync_tmp1_d.

Logic element 128 functions as a (2×1) multiplexer (mux) as follows. If the destination-domain counter signal count_dst is greater than or equal to 1 and if the data signal data_sync_tmp2 is high, then logic element 128 sets the output data signal data_sync to be the data signal data_sync_tmp2. Otherwise, logic element 128 sets the output data signal data_sync to be the data signal data_sync_tmp1_d.

Pulse sync circuit 100 handles a variety of different applications and/or situations, where "handles" means that pulse sync circuit 100 successfully converts each data pulse in the source-domain input data signal into a corresponding, distinct data pulse in the destination-domain output data signal. In particular, pulse sync circuit 100 handles applications in which the destination clock clk_dst is faster than the source clock clk_src. In addition, pulse sync circuit 100 handles applications in which clk_dst is faster than clk_src. Pulse sync circuit 100 also handles applications in which clk_dst and clk_src have the same speed, but possibly different phase. For each of these types of applications, pulse sync circuit 100 handles situations in which an input data pulse has a duration of one source-clock cycle as well as situations in which an input data pulse has a duration of multiple source-clock cycles.

In pulse sync circuit 100, the control signals applied to logic element 128 select one of its two input data signals based on whether the input data pulse is a one-cycle pulse or a multi-cycle pulse. If the counter value count_src[3:0] generated by counter 118 never gets to 1, then either there is no input data pulse or the input data pulse is a one-cycle data pulse. In either case, logic element 128 selects data signal data_sync_tmp1_d from delay element 126 to be output data signal data_sync. If, however, the counter value count_src[3:0] is 1 or more, then there is an input data pulse and it is a multi-cycle data pulse. In that case, logic element 128 selects data signal data_sync_tmp2 from FF 122 to be output data signal data_sync.

Pulse sync circuit 100 has source-domain circuitry (i.e., elements 102-112 and 116-118) and destination-domain circuitry (i.e., elements 114 and 120-128). Using the source clock, the source-domain circuitry detects data pulses in the input data signal and determines whether those data pulses are single-cycle data pulses or multi-cycle data pulses. Using the destination clock, the destination-domain circuitry converts source-domain data signals into destination-domain data signals and generates data pulses in the output data signal based on whether the input data pulse was a single-cycle data pulse or a multi-cycle data pulse.

Figure 2:
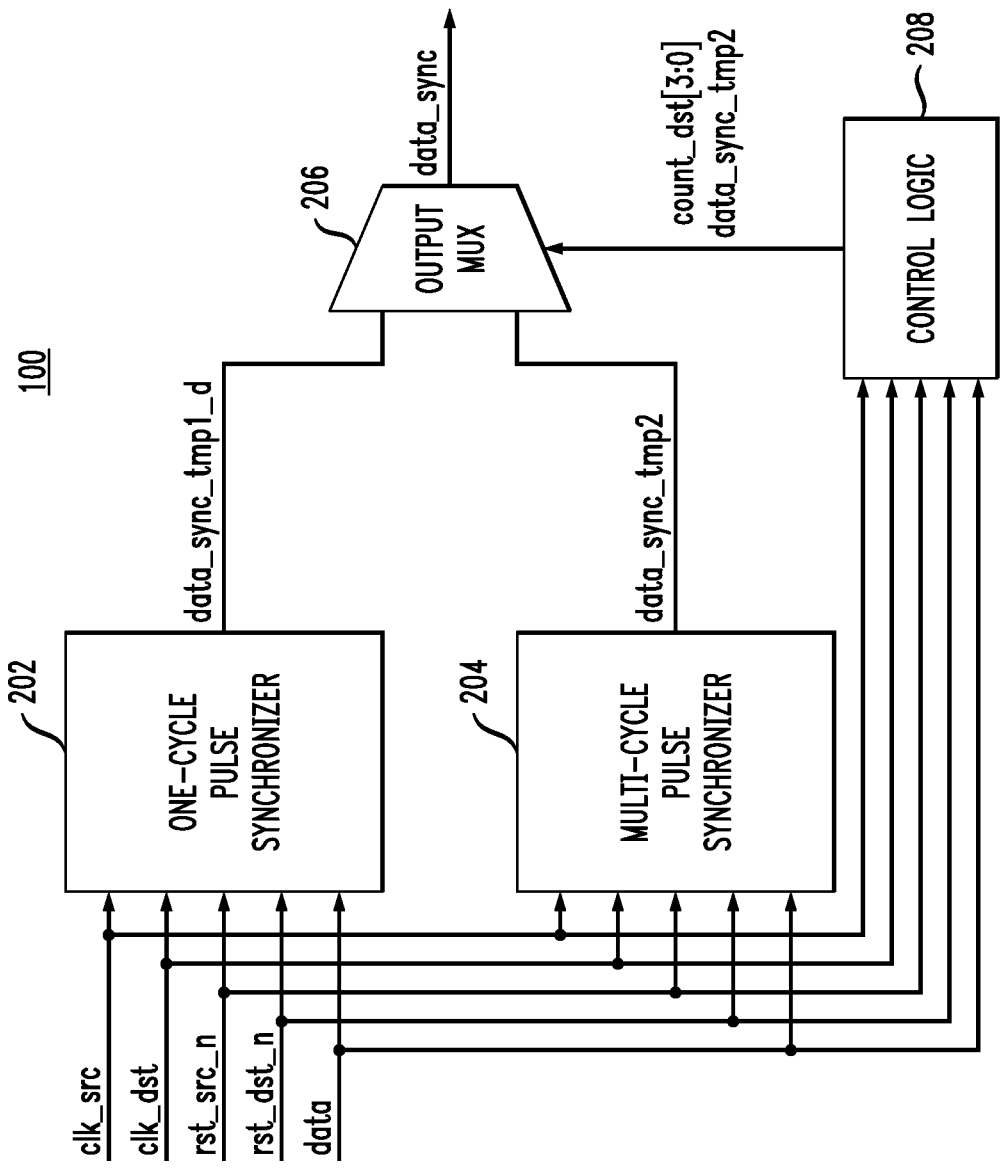
FIG. 2 shows a functional block diagram of the pulse sync circuit of FIG. 1.

FIG. 2 shows a functional block diagram of pulse sync circuit 100 of FIG. 1. As represented in FIG. 2, the various circuit elements of pulse sync circuit 100 shown in FIG. 1 can be variously grouped together to represent certain higher-level functionality of the pulse sync circuit. In particular, elements 102-116 and 124-126 function collectively as a one-cycle pulse synchronizer 202 which handles situations in which the duration of an input data pulse is one source-clock cycle and generates corresponding data signal data_sync_tmp1_d. Similarly, FF 122 functions as a multi-cycle pulse synchronizer 204 which handles situations in which the duration of an input data pulse is two or more source-clock cycles and generates corresponding data signal data_sync_tmp2. Logic element 128 functions as an output mux 206 which selects one of those two data signals to be the output data signal data_sync. Elements 118-122 function collectively as control logic 208 which generates the signals count_dst[3:0] and data_sync_tmp2, which (i) indicate whether an input data pulse has been detected and, if so, whether it is a one-cycle pulse or a multi-cycle pulse and (ii) are used by output mux 206 to perform its selection processing. Note that, since the signal data_sync_tmp2 is both a data input and a control input to output mux 206, FF 122 is considered to be part of both multi-cycle pulse synchronizer 204 and control logic 208.

Those skilled in the art will understand that the specific implementation of FIG. 1 is just one possible way of implementing the functional blocks shown in FIG. 2. Other suitable implementations that achieve analogous or similar functionality are also possible. For example, an alternative design is to add two counters: one for counting the input data using the source clock clk_src and another one for counting the output data using the destination clock clk_dst, where the goal is to match the two counts when generating the output data.

Also shown in FIGS. 1 and 2 are two asynchronous reset (low) signals: rst_src_n for the source-domain elements and rst_dst_n for the destination-domain elements, where an element is reset when the corresponding reset signal is low. For the following timing diagrams, both reset signals are assumed always to be high.

Figure 3:
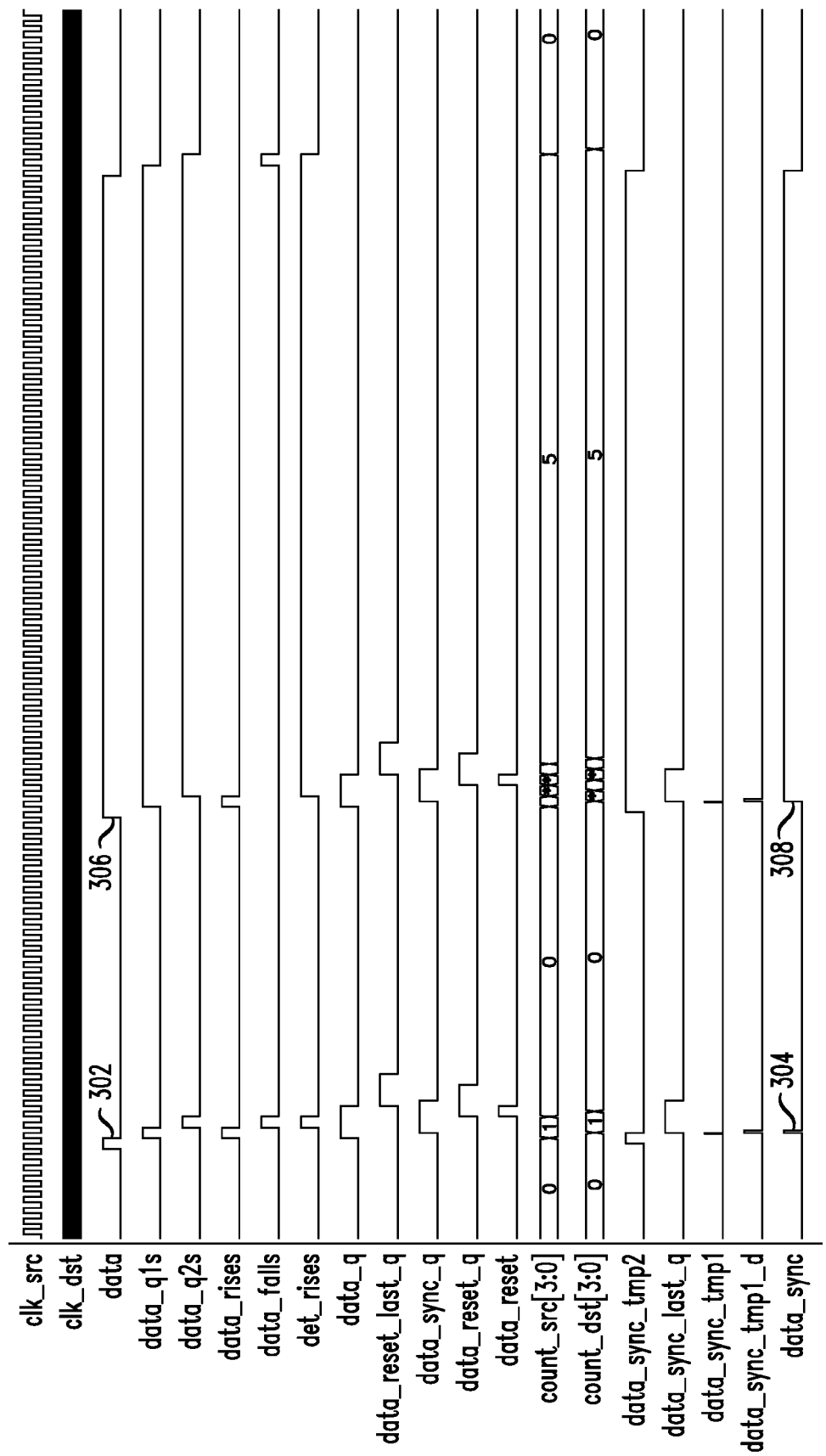
FIG. 3 shows a timing diagram for an application of the pulse sync circuit of FIG. 1 in which the destination clock is faster than the source clock.

FIG. 3 shows a timing diagram for an application of pulse sync circuit 100 in which the destination clock clk_dst is faster than the source clock clk_src. This timing diagram includes a situation in which in which an input data pulse 302 has a duration of one source-clock cycle as well as a situation in which an input data pulse 306 has a duration of multiple source-clock cycles.

In particular, output data pulse 304 corresponds to one-cycle input data pulse 302, while output data pulse 308 corresponds to multi-cycle input data pulse 306. Note that, when the destination clock is faster than the source clock, the output data pulses are roughly the same size as or smaller than the input data pulses and approximately aligned in time with the input data pulses.

Figure 4:
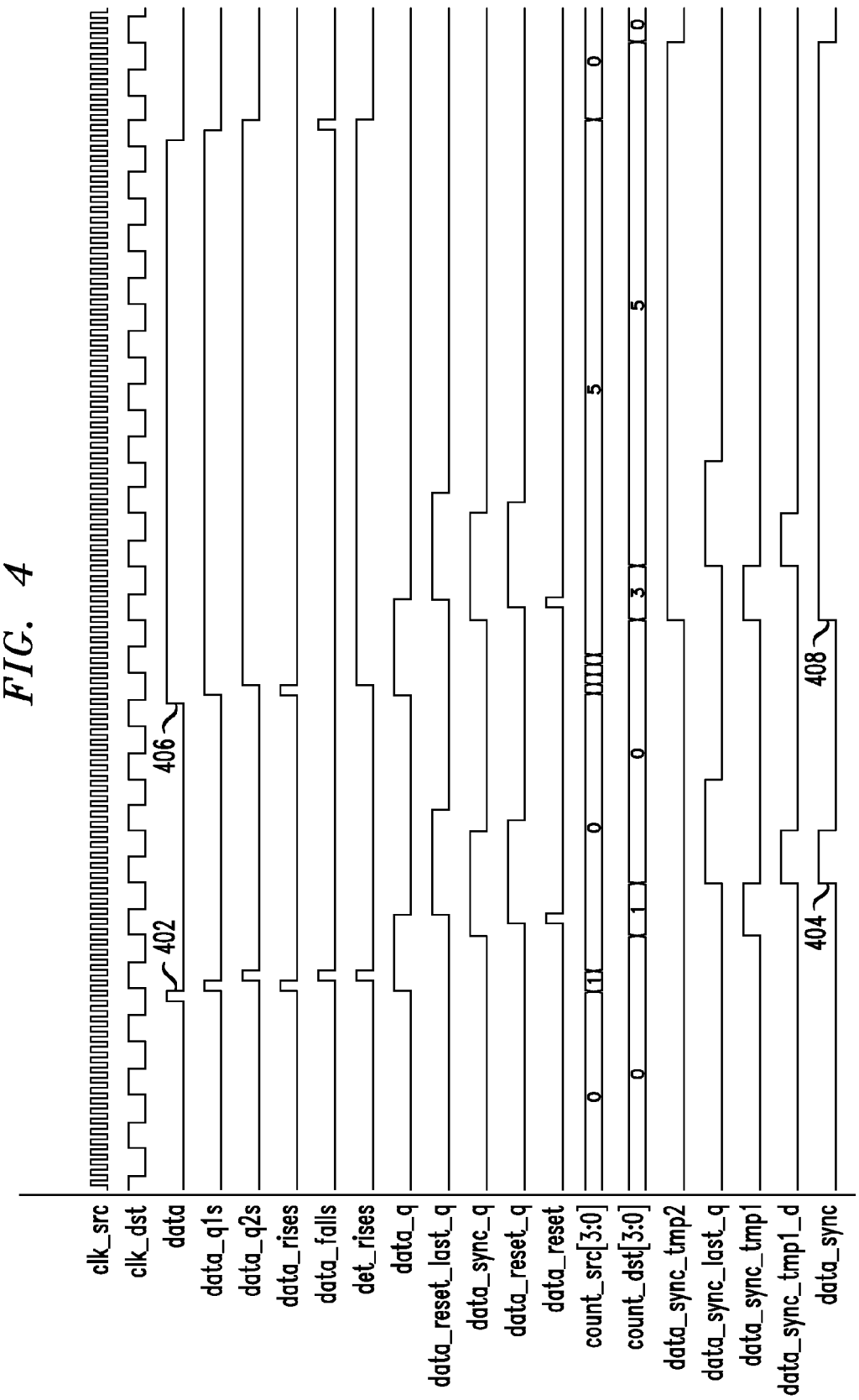
FIG. 4 shows a timing diagram for an application of the pulse sync circuit of FIG. 1 in which the destination clock is slower than the source clock.

FIG. 4 shows a timing diagram for an application of pulse sync circuit 100 in which the destination clock clk_dst is slower than the source clock clk_src. This timing diagram also includes a situation in which in which an input data pulse 402 has a duration of one source-clock cycle as well as a situation in which an input data pulse 406 has a duration of multiple source-clock cycles.

In particular, output data pulse 404 corresponds to one-cycle input data pulse 402, while output data pulse 408 corresponds to multi-cycle input data pulse 406. Note that, when the destination clock is slower than the source clock, the output data pulses are bigger than the input data pulses and delayed in time with respect to the input data pulses. In particular, since the minimum data pulse size is one clock cycle, one-cycle input data pulse 402 having a duration equal to one source-clock cycle is converted into one-cycle output data pulse 404 having a duration equal to one destination-clock cycle.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. Apparatus comprising a pulse synchronizer circuit for converting an input data signal in a source-clock domain into an output data signal in a destination-clock domain, the pulse synchronizer circuit comprising:
   a one-cycle pulse synchronizer configured to generate a first data signal indicative of input data pulses in the input data signal having a duration of one source-clock cycle;
   a multi-cycle pulse synchronizer configured to generate a second data signal indicative of input data pulses in the input data signal having a duration of multiple source-clock cycles;
   an output mux configured to receive the first and second data signals and generate the output data signal having an output data pulse for each detected input data pulse in the input data signal; and
   control logic configured to control the output mux.

2. The apparatus of claim 1, wherein the pulse synchronizer circuit is configured to generate the output data signal having an output data pulse for each input data pulse in the input data signal independent of whether the source clock is faster or slower than the destination clock.

3. The apparatus of claim 1, wherein the pulse synchronizer circuit is configured to generate the output data signal having an output data pulse for each input data pulse in the input data signal independent of whether the input data pulse has a duration of one source-clock cycle or multiple source-clock cycles.

4. The apparatus of claim 1, wherein the pulse synchronizer circuit comprises:

source-domain circuitry configured to use the source clock to detect input data pulses in the input data signal and generate one or more signals that indicate whether each detected input data pulse is a single-cycle data pulse or a multi-cycle data pulse; and destination-domain circuitry configured to use the destination clock to convert source-domain data signals into destination-domain data signals and generate an output data pulse in the output data signal based on whether the corresponding detected input data pulse is a single-cycle data pulse or a multi-cycle data pulse.

5. The apparatus of claim 1, wherein:

the one-cycle pulse synchronizer comprises:

first circuitry configured to detect rising and falling edges of each input data pulse and generate a source-domain pulse-detection signal indicating that an input data pulse has been detected; and second circuitry configured to convert the source-domain pulse-detection signal into a one-cycle destination-domain pulse-detection signal;

the multi-cycle pulse synchronizer comprises third circuitry configured to convert the source-domain input data signal into a destination-domain data signal;

the control logic comprises:

fourth circuitry configured to generate a source-domain counter signal indicating when an input data pulse has a duration greater than one source-clock cycle; and fifth circuitry configured to convert the source-domain counter signal into a destination-domain counter signal;

the output mux comprises sixth circuitry configured to receive (i) the one-cycle destination-domain pulse-detection signal and the destination-domain data signal as the first and second data signals and (ii) the destination-domain counter signal and the destination-domain data signal as control signals, wherein the output mux selects one of the one-cycle destination-domain pulse-detection signal and the destination-domain data signal as the output data signal based on the destination-domain counter signal and the destination-domain data signal.

6. The apparatus of claim 5, wherein:

the pulse synchronizer circuit is configured to generate the output data signal having an output data pulse for each input data pulse in the input data signal (i) independent of whether the source clock is faster or slower than the destination clock and (ii) independent of whether the input data pulse has a duration of one source-clock cycle or multiple source-clock cycles; and the pulse synchronizer circuit comprises:

source-domain circuitry configured to use the source clock to detect input data pulses in the input data signal and generate one or more signals that indicate whether each detected input data pulse is a single-cycle data pulse or a multi-cycle data pulse; and destination-domain circuitry configured to use the destination clock to convert source-domain data signals into destination-domain data signals and generate an output data pulse in the output data signal based on whether the corresponding detected input data pulse is a single-cycle data pulse or a multi-cycle data pulse.

7. The apparatus of claim 1, wherein the apparatus is an integrated circuit.

8. The apparatus of claim 1, wherein the pulse synchronizer circuit (i) receives a source clock of the source-clock domain and a destination clock of the destination-clock domain and (ii) uses both the source clock and the destination clock to generate the output data signal from the input data signal.

\* \* \* \* \*